(12) United States Patent
Ohtaki et al.

(10) Patent No.: US 7,382,841 B2
(45) Date of Patent: Jun. 3, 2008

(54) OFDM RECEIVER FOR EASILY SYNCHRONIZING BASE BAND SIGNAL

(75) Inventors: Yukio Ohtaki, Fukushima-ken (JP); Kouta Iijima, Fukushima-ken (JP); Takeo Suzuki, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 753 days.

(21) Appl. No.: 10/654,732

(22) Filed: Sep. 4, 2003

(65) Prior Publication Data

US 2004/0052205 A1 Mar. 18, 2004

(30) Foreign Application Priority Data

Sep. 17, 2002 (JP) ............................. 2002-270483

(51) Int. Cl.
*H04B 7/10* (2006.01)
*H04L 1/02* (2006.01)

(52) U.S. Cl. ................... 375/347; 375/349; 370/203

(58) Field of Classification Search .............. 375/316, 375/340, 349, 347, 371, 267; 370/203
See application file for complete search history.

(56) References Cited

U.S. PATENT DOCUMENTS 5,528,581 A * 6/1996 De Bot .................. 370/203

| | | | |
|---|---|---|---|
| 6,654,340 B1 * | 11/2003 | Jones et al. ............. | 370/208 |
| 6,654,429 B1 * | 11/2003 | Li ......................... | 375/316 |
| 6,757,241 B1 * | 6/2004 | Jones et al. ............. | 370/208 |
| 6,940,914 B1 * | 9/2005 | Lo et al. ................. | 375/260 |
| 6,947,408 B1 * | 9/2005 | Liberti et al. ........... | 370/345 |
| 7,103,119 B2 * | 9/2006 | Matsuoka et al. ....... | 375/347 |
| 7,123,667 B2 * | 10/2006 | Nagayasu ............... | 375/316 |
| 2005/0100120 A1 * | 5/2005 | Barton et al. ........... | 375/347 |

FOREIGN PATENT DOCUMENTS

| | | |
|---|---|---|
| DE | 198 49 318 | 4/2000 |
| EP | 1 148 659 | 10/2001 |
| EP | 1 161 000 | 12/2001 |
| JP | 2003-018123 | 1/2003 |

* cited by examiner

*Primary Examiner*—Jean B. Corrielus
(74) *Attorney, Agent, or Firm*—Brinks Hofer Gilson & Lione

(57) ABSTRACT

An OFDM receiver has four antennas or more for receiving an OFDM modulated high frequency signal, and plural OFDM demodulators for inputting a baseband signal of a time domain thereto on the basis of the high frequency signal and outputting the baseband signal of a frequency domain, wherein the OFDM demodulators are arranged every plural antenna groups with two or more of the antennas as one group, and a signal is diversity-synthesized by a first phase shifter until the baseband signal of the time domain is inputted to each of the OFDM demodulators, and the baseband signal of the frequency domain is diversity-synthesized by a second phase shifter.

9 Claims, 4 Drawing Sheets

OFDM RECEIVER FOR EASILY SYNCHRONIZING BASE BAND SIGNAL

BACKGROUND OF THE INVENTION

1. Field of the Invention

This invention relates to an OFDM receiver for receiving an OFDM (Orthogonal Frequency Division Multiplexing) modulated high frequency signal by diversity synthesis, and particularly relates to an OFDM receiver suitably used in a television receiver for car mounting.

2. Description of the Related Art

FIG. 4 shows a conventional OFDM receiver. In FIG. 4, plural antennas (shown in the case of four antennas) 111, 121, 131, 141 for receiving an OFDM modulated high frequency signal are arranged in places separated from each other on a vehicle as one example. Receiving portions 112, 122, 132, 142 are correspondingly connected to the respective antennas 111 to 141. The respective receiving portions 112 to 142 have the same construction, and frequency-convert the high frequency signal to be received to an intermediate frequency signal. A/D converters 113, 123, 133, 143 are connected to the next stages of the respective receiving portions 112 to 142. Each A/D converter converts the intermediate frequency signal to a digital signal, and outputs a baseband signal of a time domain.

First to fourth OFDM demodulating means 114, 124, 134, 144 are connected to the next stages of the respective A/D converters 113 to 143. The respective OFDM demodulating means 114 to 144 have a high speed Fourier converter of the same construction therein, and perform conversion to the baseband signal of a frequency domain by performing Fourier transformation by taking synchronization of the baseband signal of the time domain.

A first phase control circuit 151 is connected between the output terminal of the first OFDM demodulating means 114 and the output terminal of the second OFDM demodulating means 124 among the above four OFDM demodulating means. A second phase control means 152 is connected between the output terminal of the first OFDM demodulating means 114 and the output terminal of the third OFDM demodulating means 134. A third phase control means 153 is connected between the output terminal of the first OFDM demodulating means 114 and the output terminal of the fourth OFDM demodulating means 144. A first phase shifter 154, a second phase shifter 155 and a third phase shifter 156 are respectively connected to the next stages of the second to fourth OFDM demodulating means.

The respective phase control means 151 to 153 have the same construction, and respectively compare the phase of the baseband signal of the frequency domain outputted from the second to fourth OFDM demodulating means 124, 134, 144 and the phase of the baseband signal of the frequency domain outputted from the first OFDM demodulating means 114, and respectively output its phase difference signals to the first to third phase shifters 154 to 156. Each of the phase shifters 154 to 156 outputs a baseband signal of the frequency domain conformed to the phase of the baseband signal of the frequency domain outputted from the first OFDM demodulating means 114 by changing the phase of the inputted baseband signal of the frequency domain by each phase difference signal.

The baseband signal of the frequency domain outputted from the first OFDM demodulating means 114 and the baseband signal of the frequency domain outputted from the first phase shifter 154 are added by a first adder 157. The baseband signal of the frequency domain outputted from the second phase shifter 155 and the baseband signal of the frequency domain outputted from the third phase shifter 156 are added by a second adder 158. A third adder 159 is connected between the output terminal of the first adder 157 and the output terminal of the second adder 158. Accordingly, the baseband signals of the frequency domain outputted from all the OFDM demodulating means 114 to 144 are finally added by the third adder 159 in the same phase relation. Accordingly, a baseband signal having maximum signal electric power is obtained from the third adder 159. A bit error included in the added baseband signal is corrected by an error correcting means 160, and the corrected baseband signal of the frequency domain is outputted.

When there is an antenna greatly reduced in level of the received high frequency signal by fading caused by e.g., the movement of a mounted vehicle in the conventional OFDM receiver, it is impossible to accurately take the synchronization of the baseband signal of the time domain in the OFDM demodulating means corresponding to this antenna. In such a state, no Fourier transformation can be also accurately performed by this OFDM demodulating means so that no baseband signal of electric power sufficient to correct the error and corresponding to the number of antennas can be obtained. Accordingly, the problem of causing a reduction in image quality, etc. is caused.

Further, since the expensive OFDM demodulating means is arranged by the same number correspondingly with each antenna, it has a disadvantage in that the receiver is high in cost.

SUMMARY OF THE INVENTION

An object of the present invention is to reduce cost by reducing the number of OFDM demodulating means, and easily synchronize the baseband signal of the time domain in the OFDM demodulating means.

Therefore, an OFDM receiver of the present invention as a means for solving the above problems comprises four antennas or more for receiving an OFDM modulated high frequency signal, and plural OFDM demodulating means for inputting a baseband signal of a time domain thereto on the basis of the high frequency signal and outputting the baseband signal of a frequency domain, wherein the OFDM demodulating means are arranged every plural antenna groups with two or more of the antennas as one group, and a first phase shifter is arranged on the former stage side of each of the OFDM demodulating means, and a second phase shifter is arranged at the latter stage of another OFDM demodulating means except for a specific OFDM demodulating means among the OFDM demodulating means, and a signal is diversity-synthesized by the first phase shifter until the baseband signal of the time domain is inputted to each of the OFDM demodulating means, and the baseband signal of the frequency domain is diversity-synthesized by the second phase shifter.

Further, the baseband signal of the time domain based on the high frequency signal received by a specific antenna in each of the antenna groups, and the baseband signal of the time domain based on the high frequency signal received by another antenna except for the specific antenna are diversity-synthesized by the first phase shifter.

Further, a receiving portion for frequency-converting the high frequency signal to an intermediate frequency signal, and an A/D converter for converting the intermediate frequency signal to a digital signal and outputting the baseband signal of the time domain are arranged every each of the antennas, and the first phase shifter is arranged at the next stage of the A/D converter corresponding to the another antenna, and a first adder is arranged between the first phase shifter and the A/D converter corresponding to the specific antenna.

Further, the intermediate frequency signal based on the high frequency signal received by the specific antenna in each of the antenna groups, and the intermediate frequency signal based on the high frequency signal received by another antenna except for the specific antenna are diversity-synthesized by the first phase shifter.

Further, a receiving portion for frequency-converting the high frequency signal to the intermediate frequency signal is arranged every each of the antennas, and the first phase shifter is arranged at the next stage of the receiving portion corresponding to the another antenna, and a first adder is arranged between the receiving portion corresponding to the specific antenna and the first phase shifter.

Further, the high frequency signal received by the specific antenna in each of the antenna groups, and the high frequency signal received by another antenna except for the specific antenna are diversity-synthesized by the first phase shifter.

Further, the first phase shifter is connected to the another antenna, and a first adder is arranged between the specific antenna and the first phase shifter.

Further, power detecting means for detecting electric power of the baseband signal of the time domain, and phase control means for controlling phase setting of the first phase shifter so as to maximize the electric power are arranged.

Further, the second phase shifter is arranged at the next stage of the another OFDM demodulating means, and a second adder is arranged between the specific OFDM demodulating means and the second phase shifter.

Further, the OFDM receiver further comprises phase control means for controlling phase setting of the second phase shifter such that the phase of the baseband signal of the frequency domain outputted from the second phase shifter is conformed to the phase of the baseband signal of the frequency domain outputted from the specific OFDM demodulating means.

DESCRIPTION OF THE PREFERRED EMBODIMENTS

Figure 1:
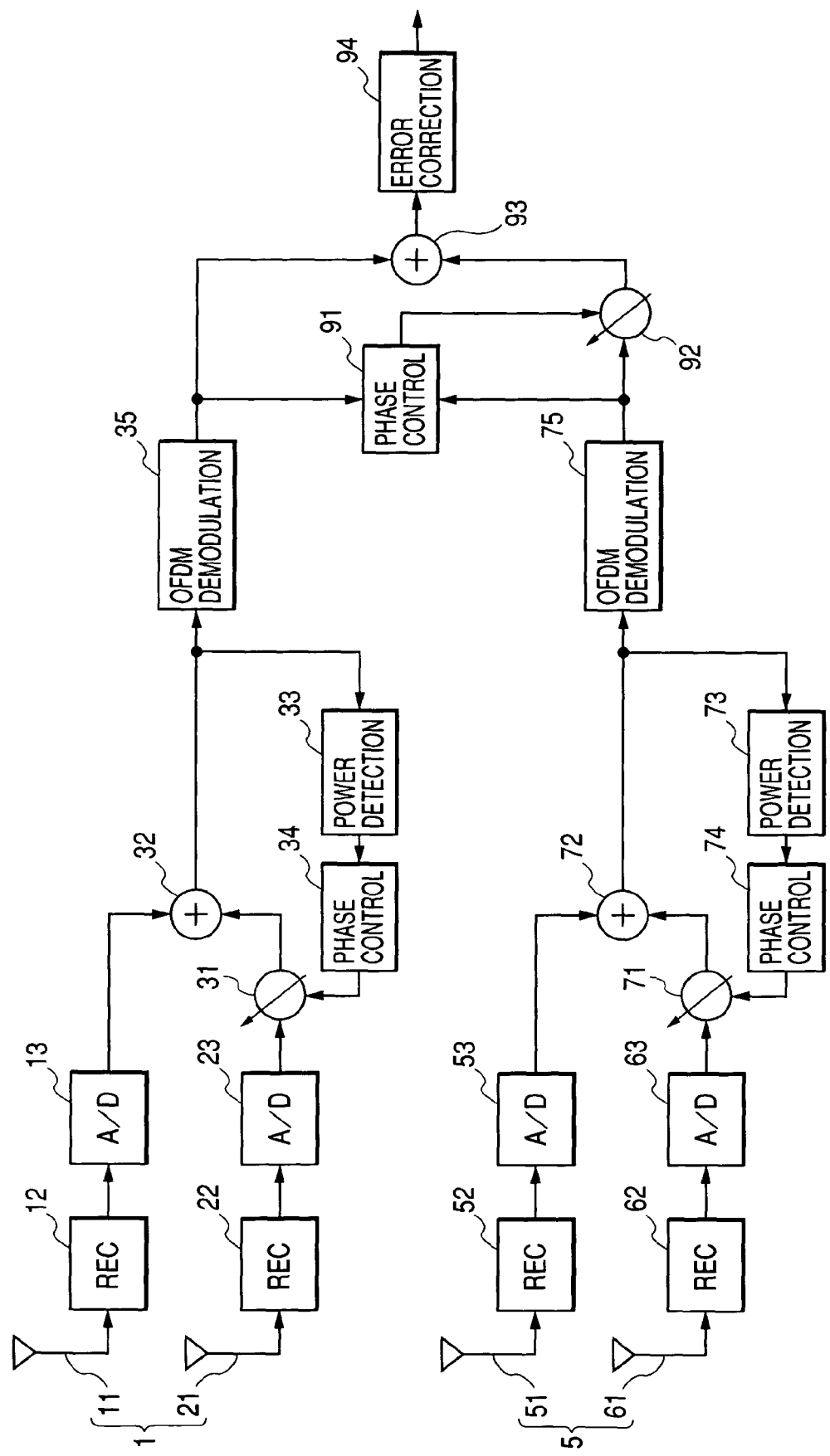
FIG. 1 is a circuit diagram showing the construction of a first embodiment mode in an OFDM receiver of the present invention.
Figure 2:
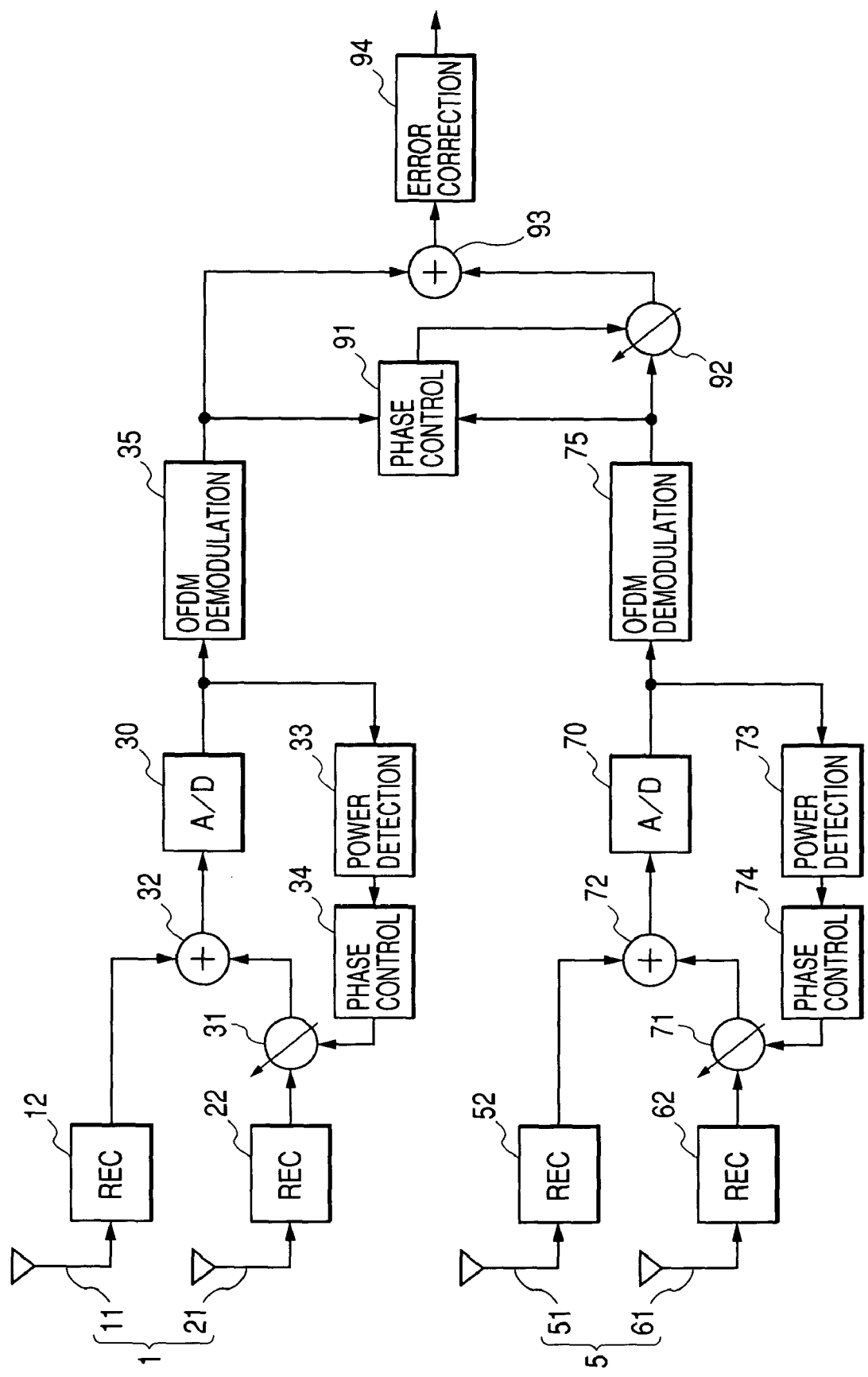
FIG. 2 is a circuit diagram showing the construction of a second embodiment mode in the OFDM receiver of the present invention.
Figure 3:
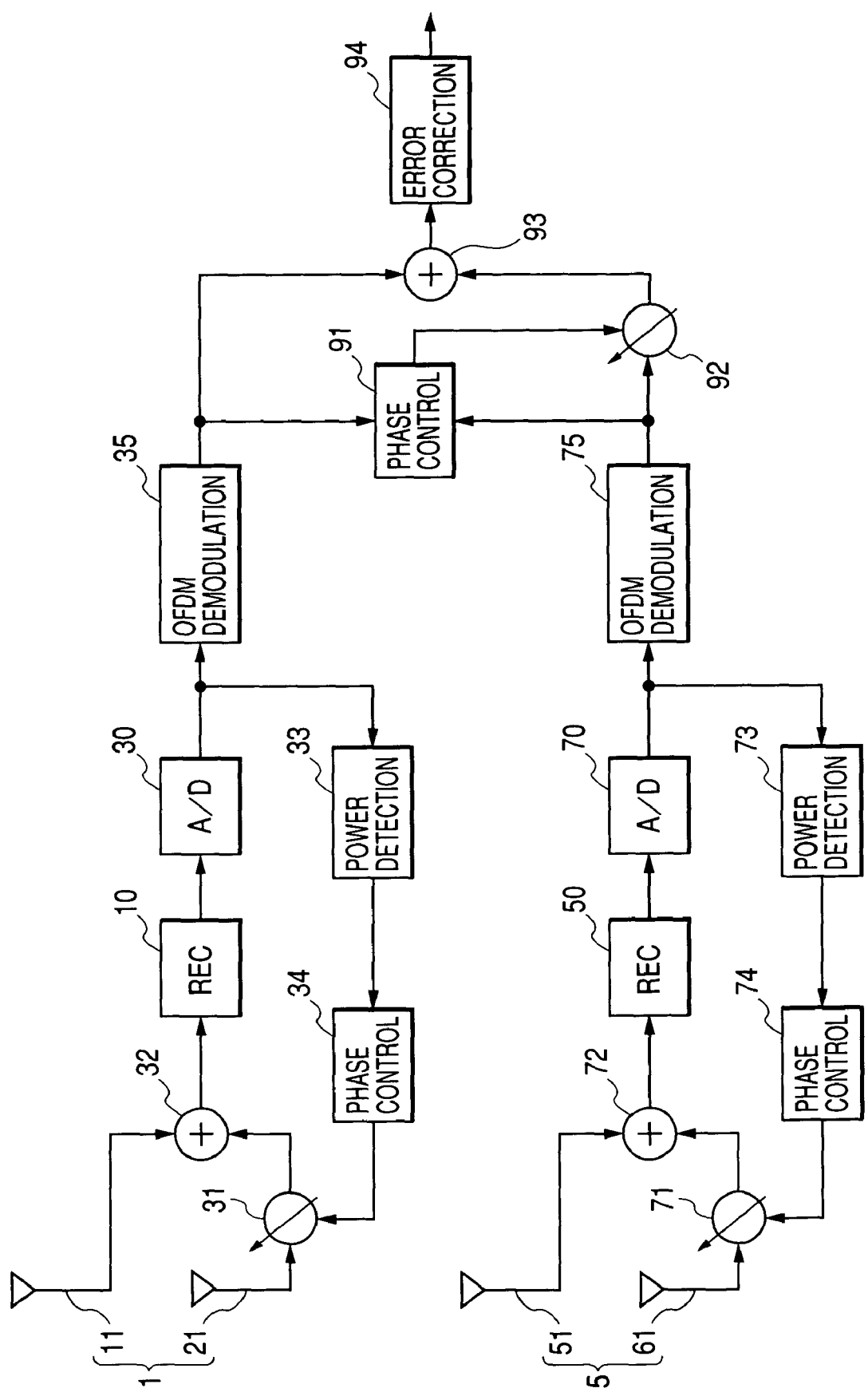
FIG. 3 is a circuit diagram showing the construction of a third embodiment mode in the OFDM receiver of the present invention.
Figure 4:
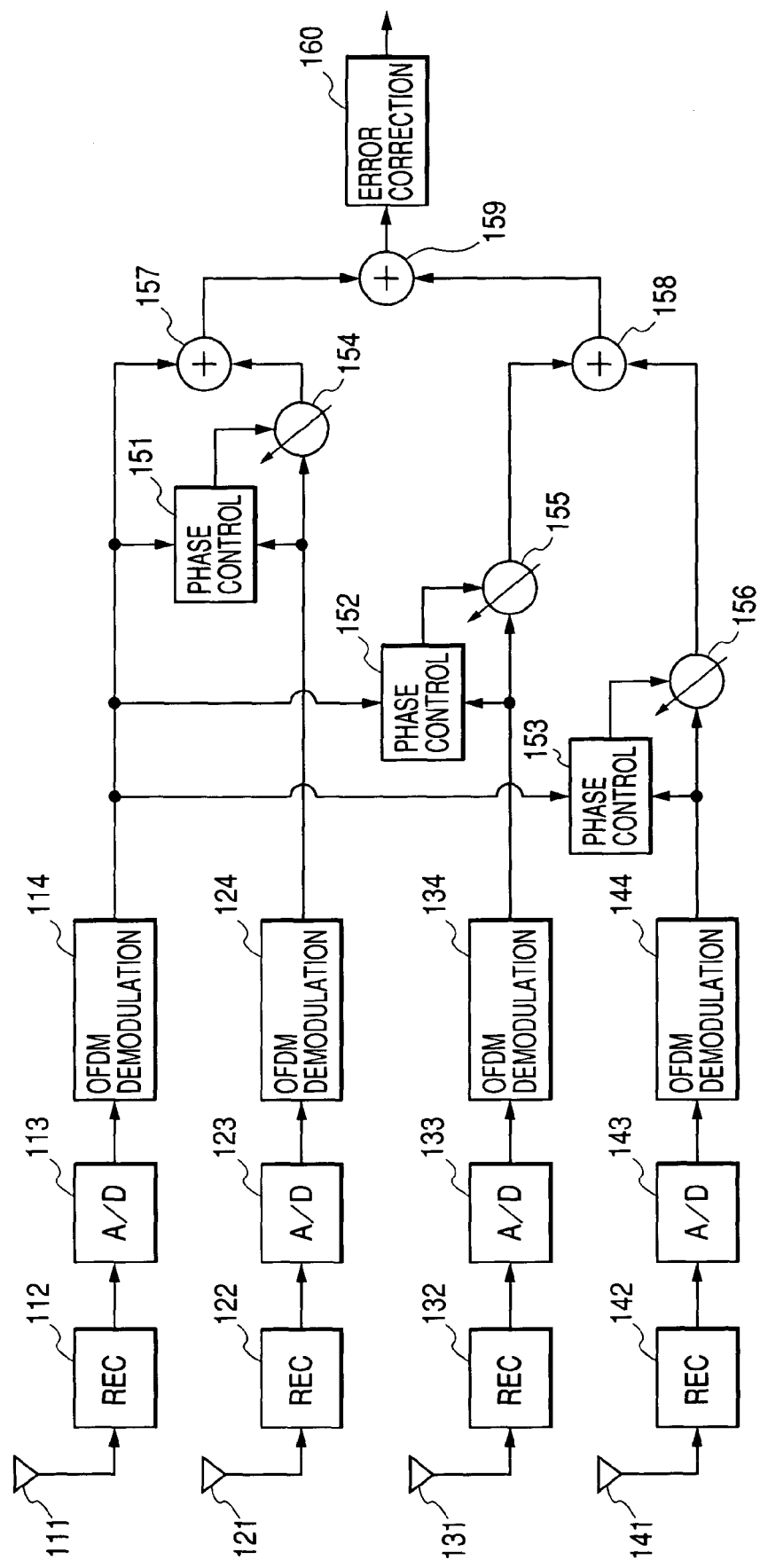
FIG. 4 is a circuit diagram showing the construction of a conventional OFDM receiver.

An OFDM receiver of the present invention will next be explained in accordance with the drawings. FIG. 1 shows the construction of a first embodiment mode. FIG. 2 shows the construction of a second embodiment mode. FIG. 3 shows the construction of a third embodiment mode.

First, in FIG. 1, plural antennas (shown in the case of four antennas) 11, 21, 51, 61 for receiving an OFDM modulated high frequency signal are arranged in places separated from each other on a vehicle as one example. Here, antennas 11 and 21 and antennas 51 and 61 belong to separate antenna groups. A receiving portion 12 and an A/D converter 13 are sequentially cascade-connected to one specific antenna 11 in a first antenna group 1. A receiving portion 22, an A/D converter 23 and a first phase shifter 31 are sequentially cascade-connected to another antenna 21 except for the specific antenna 11. A first adder 32 is connected to the output terminal of the A/D converter 13 and the output terminal of the first phase shifter 31. Here, the specific antenna 11 is distinguished from another antenna 21 because no first phase shifter 31 is interposed between the first adder 32 and the A/D converter 13 corresponding to the specific antenna 11.

A power detecting means 33 and one specific OFDM demodulating means 35 are connected to the next stage of the first adder 32. A phase control means 34 is connected between the power detecting means 33 and the first phase shifter 31.

On the other hand, a receiving portion 52 and an A/D converter 53 are sequentially cascade-connected to one specific antenna 51 in a second antenna group 5. A receiving portion 62, an A/D converter 63 and a first phase adder 71 are sequentially cascade-connected to another antenna 61 except for the specific antenna 51. A first adder 72 is connected to the output terminal of the A/D converter 53 and the output terminal of the first phase shifter 71. Here, similar to the above case, the specific antenna 51 is distinguished from another antenna 61 because no first phase shifter 71 is interposed between the first adder 72 and the A/D converter 53 corresponding to the specific antenna 51.

A power detecting means 73 and another OFDM demodulating means 75 except for the specific OFDM demodulating means 35 are connected to the next stage of the first adder 72. A phase control means 74 is connected between the power detecting means 73 and the first phase shifter 71.

A third adder 93 is connected to the next stage of the specific OFDM demodulating means 35. A second phase shifter 92 is connected to the next stage of another OFDM demodulating means 75. A third adder 93 is connected to the next stage of the second phase shifter 92. Here, the specific OFDM demodulating means 35 is distinguished from another OFDM demodulating means 75 because no second phase shifter 92 is interposed between the specific OFDM demodulating means 35 and the third adder 93.

A phase control means 91 is arranged between the output terminal of the specific OFDM demodulating means 35 and the output terminal of another OFDM demodulating means 75, and its output terminal is connected to the second phase shifter 92.

In the above construction, the receiving portions 12, 22, 52, 62 mutually have the same construction, and convert the frequency of a high frequency signal to be received to the frequency of an intermediate frequency signal. The A/D converters 13, 23, 53, 63 also have the same construction, and convert the intermediate frequency signal to a digital baseband signal of a time domain. The first phase shifters 31, 71 also have the same construction. The power detecting means 33, 73 also have the same construction, and detect electric power of the baseband signal of the time domain. The phase control circuits 34, 74 also have the same construction, and respectively control the operations of the first phase shifters 31, 71.

Here, the baseband signal of the time domain outputted from the A/D converter 13 corresponding to the specific antenna 11 is directly inputted to the first adder 32 corresponding to the first antenna group 1. On the other hand, the baseband signal of the time domain outputted from the A/D converter 23 corresponding to another antenna 21 is inputted through the first phase shifter 31. In this case, the phase of the first phase shifter 31 is set by the phase control circuit 34 such that signal electric power detected by the power detecting means 33 becomes maximum. As this result, the phase of the baseband signal of the time domain inputted from the first phase shifter 31 to the first adder 32 is conformed to the phase of the baseband signal of the time domain directly inputted from the A/D converter 13 to the first adder 32. Namely, diversity synthesis is made at the stage of the baseband signal of the time domain. Accordingly, the baseband signal of the time domain having maximum electric power is inputted to the specific OFDM demodulating means 35.

Similarly, the baseband signal of the time domain outputted from the A/D converter 53 corresponding to the specific antenna 51 is directly inputted to the first adder 72 corresponding to the second antenna group 5. On the other hand, the baseband signal of the time domain outputted from the A/D converter 63 corresponding to another antenna 61 is inputted through the first phase shifter 71. Similarly, the phase of the first phase shifter 71 is set by the phase control circuit 74 such that signal electric power detected by the power detecting means 73 becomes maximum. As this result, the phase of the baseband signal of the time domain inputted from the first phase shifter 71 to the first adder 72 is conformed to the phase of the baseband signal of the time domain directly inputted from the A/D converter 53 to the first adder 72. Namely, the diversity synthesis is also made at the stage of the baseband signal of the time domain in this case. Accordingly, the baseband signal of the time domain having maximum electric power is inputted to another OFDM demodulating means 75.

Accordingly, it is easy to take synchronization for Fourier-transforming the baseband signal of the time domain in the specific OFDM demodulating means 35 and another OFDM demodulating means 75. The baseband signal of a frequency domain is outputted from each of the OFDM demodulating means 35, 75.

At the stage up to now, the phase of the baseband signal of the frequency domain outputted from the specific OFDM demodulating means 35 and the phase of the baseband signal of the frequency domain outputted from another OFDM demodulating means 75 are not necessarily conformed to each other. Therefore, when the two baseband signals of the frequency domain are inputted to the third adder 93, the phase of the baseband signal of the frequency domain outputted from another OFDM demodulating means 75 is conformed to the phase of the baseband signal of the frequency domain outputted from the specific OFDM demodulating means 35 through the second phase shifter 92. This phase alignment is controlled by the phase control means 91 for comparing the phases of the two baseband signals of the frequency domain.

As this result, the baseband signal of the frequency domain having maximum electric power is outputted from the third adder 93, and is inputted to an error correcting means 94. The error correcting means 94 corrects a bit error included in the baseband signal of the frequency domain, and outputs the corrected baseband signal of the frequency domain.

Since the diversity synthesis is made at the stage of the baseband signal of the time domain in the above construction, it is possible to cope with four antennas 11 to 61 by using only two means constructed by the specific OFDM demodulating means 35 and another OFDM demodulating means 75. Accordingly, there is an effect of a reduction in cost.

When the number of antennas is increased, the increased antennas are taken into the existing first antenna group 1 or the existing second antenna group 5, or another antenna group is newly arranged.

Next, in FIG. 2, a receiving portion 12 is connected to a specific antenna 11 in a first antenna group 1, and a receiving portion 22 and a first phase shifter 31 are sequentially cascade-connected to another antenna 21. A first adder 32 is connected between the output terminal of the receiving portion 12 and the output terminal of the first phase shifter 31. An A/D converter 30 is connected to the next stage of the first adder 32. A power detecting means 33 and a specific OFDM demodulating means 35 are connected to the next stage of the A/D converter 30. A phase control means 34 is connected between the power detecting means 33 and the first phase shifter 31.

On the other hand, a receiving portion 52 is connected to a specific antenna 51 in a second antenna group 5, and a receiving portion 62 and a first phase shifter 71 are sequentially cascade-connected to another antenna 61. A first adder 72 is connected between the output terminal of the receiving portion 52 and the output terminal of the first phase shifter 71. An A/D converter 70 is connected to the next stage of the first adder 72. A power detecting means 73 and another OFDM demodulating means 75 are connected to the next stage of the A/D converter 70. A phase control means 74 is connected between the power detecting means 73 and the first phase shifter 71.

A third adder 93 is connected to the next stage of the specific OFDM demodulating means 35. A second phase shifter 92 is connected to the next stage of another OFDM demodulating means 75. A third adder 93 is connected to the next stage of the second phase shifter 92. Here, the specific OFDM demodulating means 35 is distinguished from another OFDM demodulating means 75 because no second phase shifter 92 is interposed between the specific OFDM demodulating means 35 and the third adder 93.

A phase control means 91 is arranged between the output terminal of the specific OFDM demodulating means 35 and the output terminal of another OFDM demodulating means 75, and its output terminal is connected to the second phase shifter 92.

In the above construction, the A/D converters 30, 70 mutually have the same construction, and convert an intermediate frequency signal to a digital baseband signal of a time domain.

Here, the intermediate frequency signal outputted from the receiving portion 12 corresponding to the specific antenna 11 is directly inputted to the first adder 32 corresponding to the first antenna group 1. The intermediate frequency signal outputted from the receiving portion 22 corresponding to another antenna 21 is inputted through the first phase shifter 31. In this case, the phase of the first phase shifter 31 is set by the phase control circuit 34 such that signal electric power detected by the power detecting means 33 becomes maximum. As this result, the phase of the intermediate frequency signal inputted from the first phase shifter 31 to the first adder 32 and the phase of the intermediate frequency signal inputted from the receiving portion 12 to the first adder 32 are conformed to each other. Namely, diversity synthesis is made at the stage of the intermediate frequency signal. Accordingly, the intermediate frequency signal having maximum electric power is inputted to the A/D converter 30. The baseband signal of the time domain converted by the A/D converter 30 also has maximum electric power, and is inputted to the specific OFDM demodulating means 35.

Similarly, the intermediate frequency signal outputted from the receiving portion 52 corresponding to the specific antenna 51 is directly inputted to the first adder 72 corresponding to the second antenna group 5. The intermediate frequency signal outputted from the receiving portion 62 corresponding to another antenna 61 is inputted through the first phase shifter 71. In this case, the phase of the first phase shifter 71 is set by the phase control circuit 74 such that signal electric power detected by the power detecting means 73 becomes maximum. As this result, the phase of the intermediate frequency signal inputted from the first phase shifter 71 to the first adder 72 and the phase of the intermediate frequency signal inputted from the receiving portion 52 to the second adder 72 are conformed to each other. Namely, the diversity synthesis is made at the stage of the intermediate frequency signal. Accordingly, the intermediate frequency signal having maximum electric power is inputted to the A/D converter 70. The baseband signal of the time domain converted by the A/D converter 70 also has maximum electric power, and is inputted to another OFDM demodulating means 75.

Accordingly, it is easy to take synchronization for Fourier-transforming the baseband signal of the time domain in each of the OFDM demodulating means 35, 75. The baseband signal of a frequency domain is outputted from each of the OFDM demodulating means 35, 75.

The constructions and the operations of the latter stage sides of the specific OFDM demodulating means 35 and another OFDM demodulating means 75 are the same as FIG. 1, and their explanations are therefore omitted. Since the diversity synthesis is made at the stage of the intermediate frequency signal in the construction of FIG. 2, the number of A/D converters becomes half.

In FIG. 3, a specific antenna 11 is directly connected to a first adder 32 corresponding to a first antenna group 1, and another antenna 21 is connected through a first phase shifter 31. A receiving portion 10 and an A/D converter 30 are sequentially cascade-connected to the first adder 32. A power detecting means 33 and a specific OFDM demodulating means 35 are connected to the next stage of the A/D converter 30. A phase control means 34 is connected between the power detecting means 33 and the first phase shifter 31.

On the other hand, a specific antenna 51 is directly connected to a first adder 72 corresponding to a second antenna group 5, and another antenna 61 is connected through a first phase shifter 71. A receiving portion 50 and an A/D converter 70 are sequentially cascade-connected to the first adder 72. A power detecting means 73 and another OFDM demodulating means 75 are connected to the next stage of the A/D converter 70. A phase control means 74 is connected between the power detecting means 73 and the first phase shifter 71.

Accordingly, a high frequency signal received by the specific antenna 11 is directly inputted to the first adder 32, and a high frequency signal received by another antenna 21 is inputted through the first phase shifter 31. In this case, the phase of the first phase shifter 31 is set by the phase control circuit 34 such that signal electric power detected by the power detecting means 33 becomes maximum. As this result, the phase of the high frequency signal inputted from the first phase shifter 31 to the first adder 32 and the phase of the high frequency signal inputted from the specific antenna 11 to the first adder 32 are conformed to each other. Namely, the diversity synthesis is made at the stage of the high frequency signal. Accordingly, the high frequency signal having maximum electric power is inputted to the receiving portion 10. The baseband signal of the time domain converted by the A/D converter 30 also has maximum electric power, and is inputted to the specific OFDM demodulating means 35.

Similarly, a high frequency signal received by the specific antenna 51 is directly inputted to the first adder 72, and a high frequency signal received by another antenna 61 is inputted through the first phase shifter 71. In this case, the phase of the first phase shifter 71 is set by the phase control circuit 74 such that signal electric power detected by the power detecting means 73 becomes maximum. As this result, the phase of the high frequency signal inputted from the first phase shifter 71 to the first adder 72 and the phase of the high frequency signal inputted from the specific antenna 51 to the first adder 72 are conformed to each other. Namely, the diversity synthesis is made at the stage of the high frequency signal. Accordingly, the high frequency signal having maximum electric power is inputted to the receiving portion 70. The baseband signal of the time domain converted by the A/D converter 70 also has maximum electric power and is inputted to the specific OFDM demodulating means 75.

Accordingly, it is easy to take synchronization for Fourier-transforming the baseband signal of the time domain in each of the OFDM demodulating means 35, 75. The baseband signal of a frequency domain is outputted from each of OFDM demodulating means 35, 75.

The constructions and the operations of the latter stage side of the specific OFDM demodulating means 35 and another OFDM demodulating means 75 are the same as FIG. 1, and their explanations are therefore omitted. Since the diversity synthesis is made at the stage of the high frequency signal in the construction of FIG. 3, the number of receiving portions becomes half as well as A/D converters.

As explained above, OFDM demodulating means are arranged every plural antenna groups, and a first phase shifter is arranged on the former stage side of each of the OFDM demodulating means, and a second phase shifter is arranged at the latter stage of another OFDM demodulating means except for a specific OFDM demodulating means, and a signal is diversity-synthesized by the first phase shifter until the baseband signal of a time domain is inputted to each of the OFDM demodulating means, and the baseband signal of a frequency domain outputted from each of the OFDM demodulating means is diversity-synthesized by the second phase shifter. Accordingly, it is easy to synchronize the baseband signal of the time domain in the OFDM demodulating means, and cost can be reduced by reducing the number of OFDM demodulating means.

The baseband signal of the time domain based on a high frequency signal received by a specific antenna in each of the antenna groups, and the baseband signal of the time domain based on a high frequency signal received by another antenna except for the specific antenna are diversity-synthesized by the first phase shifter. Accordingly, the baseband signal of the time domain having maximum electric power can be inputted to each OFDM demodulating means.

A receiving portion for frequency-converting the high frequency signal to an intermediate frequency signal, and an A/D converter for converting the intermediate frequency signal to a digital signal and outputting the baseband signal of the time domain are arranged every each of the antennas, and the first phase shifter is arranged at the next stage of the A/D converter corresponding to another antenna, and a first adder is arranged between the first phase shifter and the A/D converter corresponding to the specific antenna. Accordingly, the baseband signal of the time domain can be diversity-synthesized.

An intermediate frequency signal based on the high frequency signal received by the specific antenna in each of the antenna groups, and an intermediate frequency signal based on the high frequency signal received by another antenna except for the specific antenna are diversity-synthesized by the first phase shifter. Accordingly, the number of A/D converters can be reduced.

A receiving portion for frequency-converting the high frequency signal to the intermediate frequency signal is arranged every each of the antennas, and the first phase shifter is arranged at the next stage of the receiving portion corresponding to another antenna, and a first adder is arranged between the receiving portion corresponding to the specific antenna and the first phase shifter. Accordingly, the intermediate frequency signal can be diversity-synthesized.

The high frequency signal received by the specific antenna in each of the antenna groups, and the high frequency signal received by another antenna except for the specific antenna are diversity-synthesized by the first phase shifter. Accordingly, the number of receiving portions can be reduced.

The first phase shifter is connected to another antenna, and a first adder is arranged between the specific antenna and the first phase shifter. Accordingly, the high frequency signal can be diversity-synthesized.

Power detecting means for detecting electric power of the baseband signal of the time domain, and phase control means for controlling phase setting of the first phase shifter so as to maximize the electric power are arranged. Accordingly, the diversity synthesis for maximizing the electric power of the baseband signal of the time domain can be made.

The second phase shifter is arranged at the next stage of another OFDM demodulating means, and a second adder is arranged between the specific OFDM demodulating means and the second phase shifter. Accordingly, it is possible to make the diversity synthesis with respect to the high frequency signal received by all the antennas.

The OFDM receiver further has phase control means for controlling phase setting of the second phase shifter such that the phase of the baseband signal of the frequency domain outputted from the second phase shifter is conformed to the phase of the baseband signal of the frequency domain outputted from the specific OFDM demodulating means. Accordingly, the baseband of the frequency domain can be diversity-synthesized.

What is claimed is:

1. An orthogonal frequency division multiplexing (OFDM) receiver comprising:
    at least four antennas to receive an OFDM modulated high frequency signal;
    a plurality of OFDM demodulators each configured to receive a respective time domain baseband signal generated based on the high frequency signal and to output a respective frequency domain baseband signal, wherein each OFDM demodulator is coupled to a respective antenna group, each antenna group containing at least two of the at least four antennas;
    a first phase shifter for each antenna group each having a first input coupled to the second antenna of each antenna group, an output of each first phase shifter and an output of the first antenna of each antenna group being combined in a respective one of a plurality of first adders to provide the respective time domain baseband signal to each of the OFDM demodulators;
    a first control circuit for each antenna group each coupled to an output of the respective one of the plurality of first adders and to a second input of each first phase shifter;
    a second phase shifter having a first input coupled to an output of a second OFDM demodulator that is different from a first OFDM demodulator among the OFDM demodulators;
    a second control circuit coupled to an output of the plurality of OFDM demodulators and to a second input of the second phase shifter;
    a second adder coupled to an output of the second phase shifter and an output of the first OFDM demodulator, wherein
    a signal is diversity-synthesized by the first phase shifters until the respective time domain baseband signal is inputted to each of the OFDM demodulators, and the frequency domain baseband signal output by the second OFDM demodulator is diversity-synthesized by the second phase shifter.

2. The OFDM receiver according to claim 1, wherein the time domain baseband signal generated based on the high frequency signal received by the second antenna in each of the antenna groups is diversity-synthesized by the first phase shifter of said antenna group.

3. The OFDM receiver according to claim 2, wherein each antenna in each antenna group is coupled to a respective one of a plurality of receiving portions each configured to frequency-convert the high frequency signal to a respective intermediate frequency signal and a plurality of A/D converters each coupled to a respective one of the plurality of receiving portions for converting the respective intermediate frequency signal to a respective digital signal, wherein the digital signal output by the A/D converter corresponding to the second antenna of each antenna group is coupled to the first phase shifter of said antenna group and the digital signal output by the A/D converter corresponding to the first antenna of each antenna group is coupled to the first adder of said antenna group.

4. The OFDM receiver according to claim 1, wherein an intermediate frequency signal generated based on the high frequency signal received by the second antenna in each of the antenna groups is diversity-synthesized by the first phase shifter of said antenna group.

5. The OFDM receiver according to claim 4, wherein each antenna in each antenna group is coupled to a respective one of a plurality of receiving portions each configured to frequency-convert the high frequency signal to a respective intermediate frequency signal, and the intermediate frequency signal of a first one of the receiving portions corresponding to the first antenna of each antenna group is coupled to the first adder of said antenna group and the intermediate frequency signal of a second one of the receiving portions corresponding to the second antenna of each antenna group is coupled to the first phase shifter of said antenna group.

6. The OFDM receiver according to claim 1, wherein the high frequency signal received by a first antenna in each of the antenna groups is diversity-synthesized by the first phase shifter of said antenna group.

7. The OFDM receiver according to claim 3, wherein each of the first control circuits comprising power detector to detect electric power of the time domain baseband signal and a phase controller to control phase setting of each respective one of said the first phase shifters to maximize the electric power.

8. The OFDM receiver according to claim 5, wherein each of the first control circuits comprising a power detector to detect electric power of the time domain baseband signal and a phase controller to control phase setting of each respective one of said the of the first phase shifters to maximize the electric power.

9. The OFDM receiver according to claim 6, wherein each of the first control circuits comprising a power detector to detect electric power of the time domain baseband signal, and a phase controller to control phase setting of each respective one of said the first phase shifters to maximize the electric power.

* * * * *